(No Model.)

L. STOUFFER.
VEHICLE SPRING.

No. 400,506. Patented Apr. 2, 1889.

Witnesses.
J. C. Perkins
Jos. Adams

Inventor.
Luther Stouffer
By Lewis C. West
Atty.

UNITED STATES PATENT OFFICE.

LUTHER STOUFFER, OF ST. JOSEPH, MISSOURI, ASSIGNOR OF TWO-FIFTHS TO JOSEPH W. STOUFFER, OF SAME PLACE.

VEHICLE-SPRING.

SPECIFICATION forming part of Letters Patent No. 400,506, dated April 2, 1889.

Application filed March 5, 1888. Serial No. 266,190. (No model.)

*To all whom it may concern:*

Be it known that I, LUTHER STOUFFER, a citizen of the United States, residing at St. Joseph, county of Buchanan, State of Missouri, have invented a new and useful Vehicle-Spring, of which the following is a specification.

This invention relates to combined torsion and semi-elliptical springs; and it has for its object certain below-described and claimed improvements.

Figure 1:
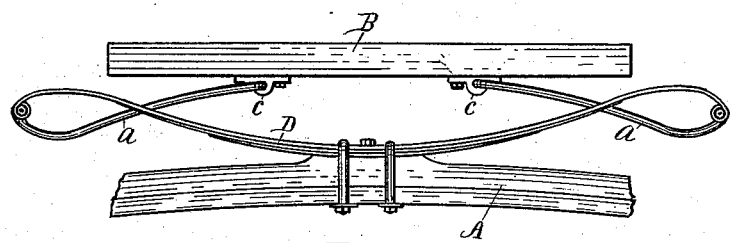
Figure 2:
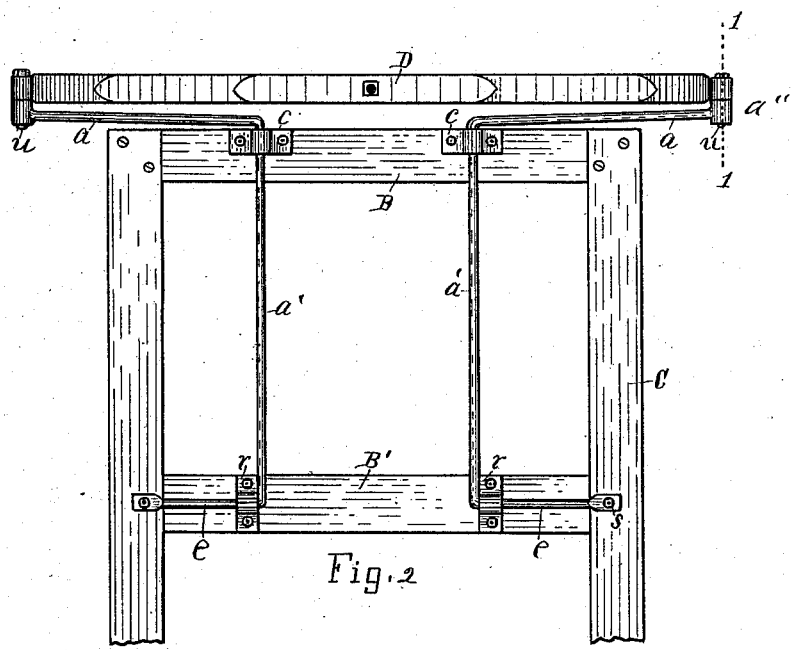
Figure 3:

In the drawings forming a part of this specification, Figure 1 is an end elevation of parts of the vehicle, showing a side view of the spring; Fig. 2, an under plan view, and Fig. 3 an enlarged view in section on line 1 1 in Fig. 2.

Referring to the letters marked on the drawings, C B show the broken frame of a vehicle-body.

B' is a cross-piece fitting between the side pieces, C. The laterally-turned ends $e$ of the torsions $a'$ are rigidly attached to the cross-piece B' by the clips $r\ r$, and the ends $e$ lap across the joint between the ends of the cross-piece B' and the inner edge of the side pieces, C, and are bolted to the latter at S, Fig. 2. By this means the ends $e$ of the torsions $a'$ serve to hold the cross-piece B' in place without tenoning into the side pieces, C. This is shown in another pending application. The other ends of the torsions are loosely confined to the frame or body at $c\ c$ by boxes. From thence the torsions turn laterally, forming arms $a$. These arms terminate in a solid head, $a''$, which have a hole drilled through them. The eyes of the torsions are embossed eyes—that is, they are widened or lugged out to the plane eyes of the semi-elliptic spring, thus keeping the springs from working near enough together to rub each other, and forming a longer eye to firmly attach the headless end of the bolt in. Into this hole the bolts or pivots $u$ are driven to a tight fit, yet detachable by a stroke of the hammer. The bolts $u$ also pass through the eyes of the semi-elliptical spring B on the axle A. Thus the arms $a$ of the torsions are side by side with the spring D, Fig. 2. The end of the bolt in the eye of the spring D is smaller, so that the eye of the spring is loose and detachable thereon, and this end of the bolt is threaded and provided with a nut. By this means the nut may be removed and the bolt $u$ driven out when desiring to detach the spring D from the torsions. In such a construction there is no limit to the distance the body of the vehicle may swing down below the axle, except the limit to the spring's capacity to yield, and there is less abnormal strain on the angled ends of the torsions which bear the eyes.

Of course it will be understood that the construction in Fig. 2 shows one end or half of a four-wheeled-vehicle running-gear.

Having thus described my invention, what I claim is—

In a vehicle of the style described, the combination of the torsions provided with the embossed eyes, the bolts larger in diameter at one end than the other, the larger ends being firmly driven into the eyes of the torsions, and the semi-elliptical springs having the eyed ends loose on the smaller ends of the bolts and the bolt-nuts, substantially as set forth.

In testimony of the foregoing I have hereunto subscribed my name in presence of two witnesses.

LUTHER STOUFFER.

Witnesses:
SAMUEL FOLZ,
CHARLES HULL.